United States Patent
Choi et al.

(10) Patent No.: US 8,120,278 B2
(45) Date of Patent: Feb. 21, 2012

(54) LED DRIVING CIRCUIT

(75) Inventors: Heung Gyoon Choi, Suwon-Si (KR); Sung Soo Hong, Seoul (KR); Sang Kyoo Han, Daejeon-Si (KR); Chung Wook Roh, Seoul (KR); Sang Ho Cho, Seongnam-Si (KR); Sang Hyun Lee, Incheon-Si (KR); Sung Ho Kim, Hwaseong-Si (KR); Tae Hyung Kang, Osan-Si (KR); Jae Sun Won, Suwon-Si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 344 days.

(21) Appl. No.: 12/473,712

(22) Filed: May 28, 2009

(65) Prior Publication Data

US 2010/0237799 A1    Sep. 23, 2010

(30) Foreign Application Priority Data

Mar. 23, 2009   (KR) .................. 10-2009-0024371

(51) Int. Cl.
*H05B 37/02*    (2006.01)

(52) U.S. Cl. .................. 315/294; 315/200 R; 315/220; 315/291; 315/308; 315/312

(58) Field of Classification Search .............. 315/200 R, 315/209 R, 210, 219, 220, 221, 224, 254, 315/255, 256, 291, 294, 307, 308, 312; 345/102
See application file for complete search history.

(56) References Cited

U.S. PATENT DOCUMENTS

| | | | | |
|---|---|---|---|---|
| 6,853,150 | B2 * | 2/2005 | Clauberg et al. | 315/185 R |
| 7,573,729 | B2 * | 8/2009 | Elferich et al. | 363/21.02 |
| 2006/0284569 | A1 * | 12/2006 | Wey et al. | 315/282 |
| 2009/0021175 | A1 * | 1/2009 | Wendt et al. | 315/200 R |
| 2009/0021179 | A1 * | 1/2009 | Kim et al. | 315/276 |
| 2009/0273301 | A1 * | 11/2009 | De Anna et al. | 315/294 |

FOREIGN PATENT DOCUMENTS

| | | |
|---|---|---|
| KR | 1020080079775 A | 9/2008 |
| KR | 1020080084028 A | 9/2008 |

* cited by examiner

*Primary Examiner* — Douglas W Owens
*Assistant Examiner* — Thai Pham
(74) *Attorney, Agent, or Firm* — Lowe, Hauptman, Ham & Berner, LLP

(57) ABSTRACT

The present invention provides an LED driving circuit including: an inverter unit for switching an input power source; a plurality of transformers including a plurality of primary windings connected to the inverter unit and connected to each other in series and a plurality of secondary windings each of which is coupled with each of the primary windings; a plurality of rectification units each of which is connected to each of the secondary windings; and a plurality of LEDs each of which is connected to each of the rectification units.

6 Claims, 13 Drawing Sheets

[FIG. 1A]
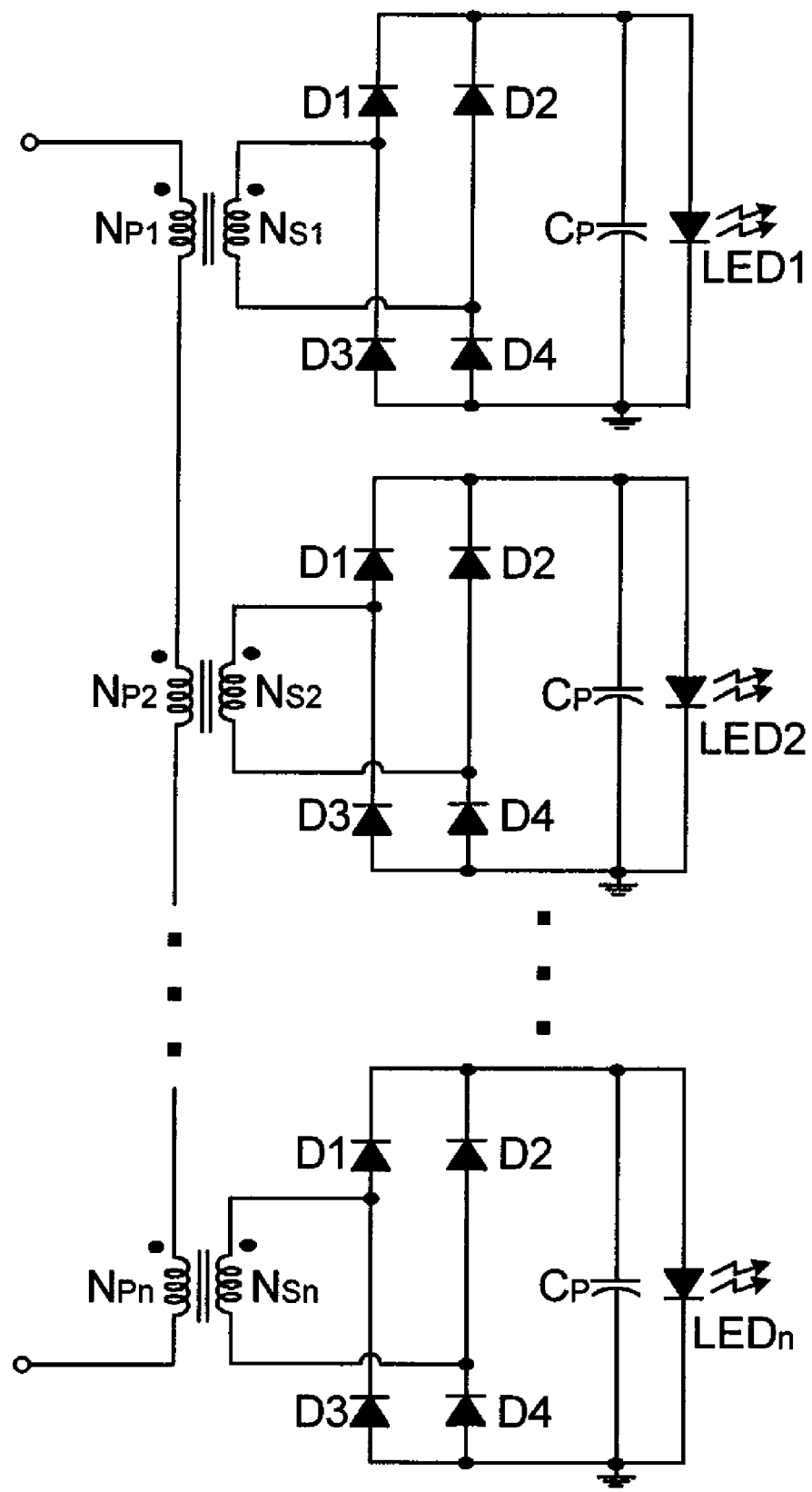

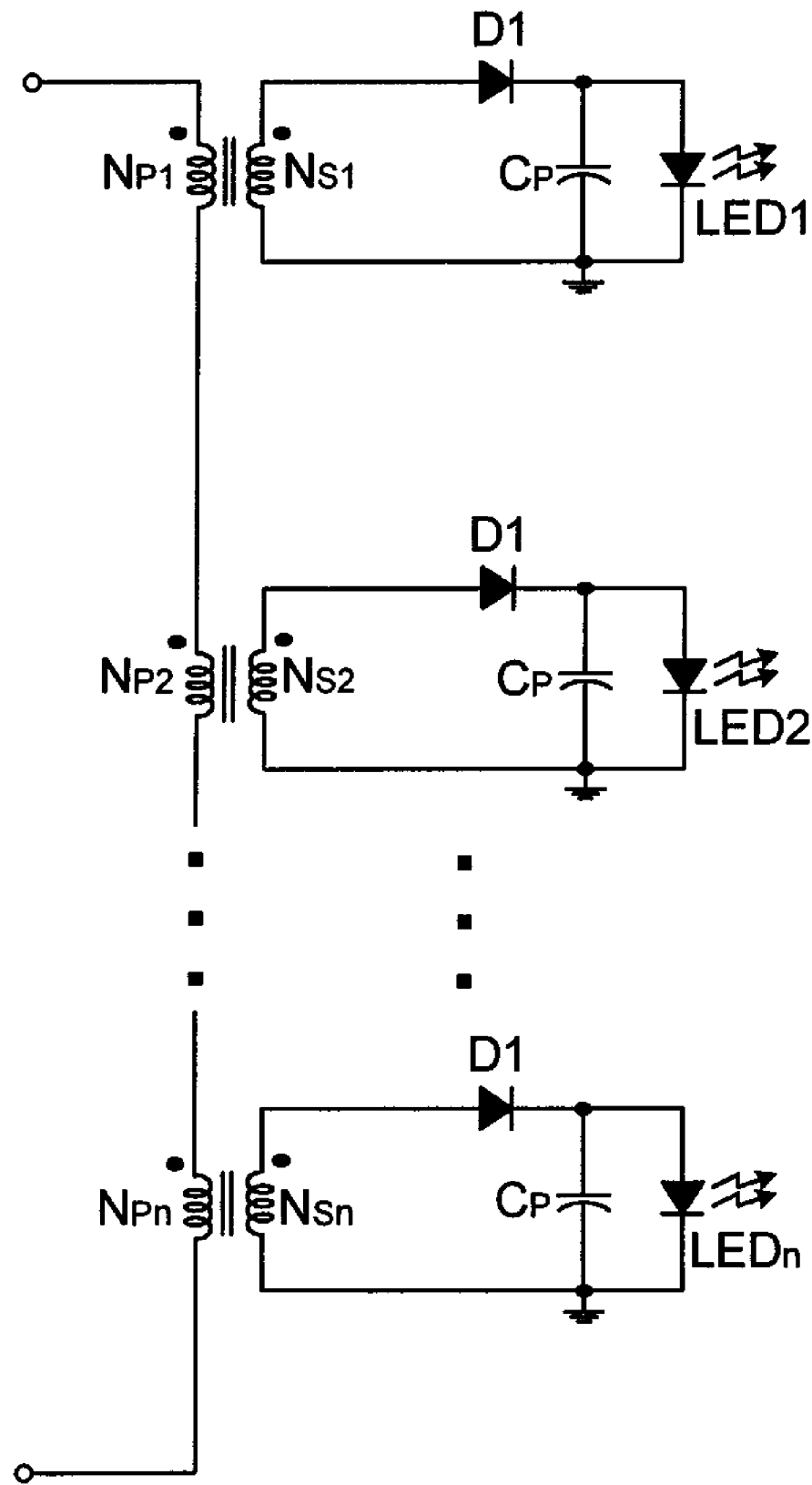
[FIG. 1B]

[FIG. 1C]
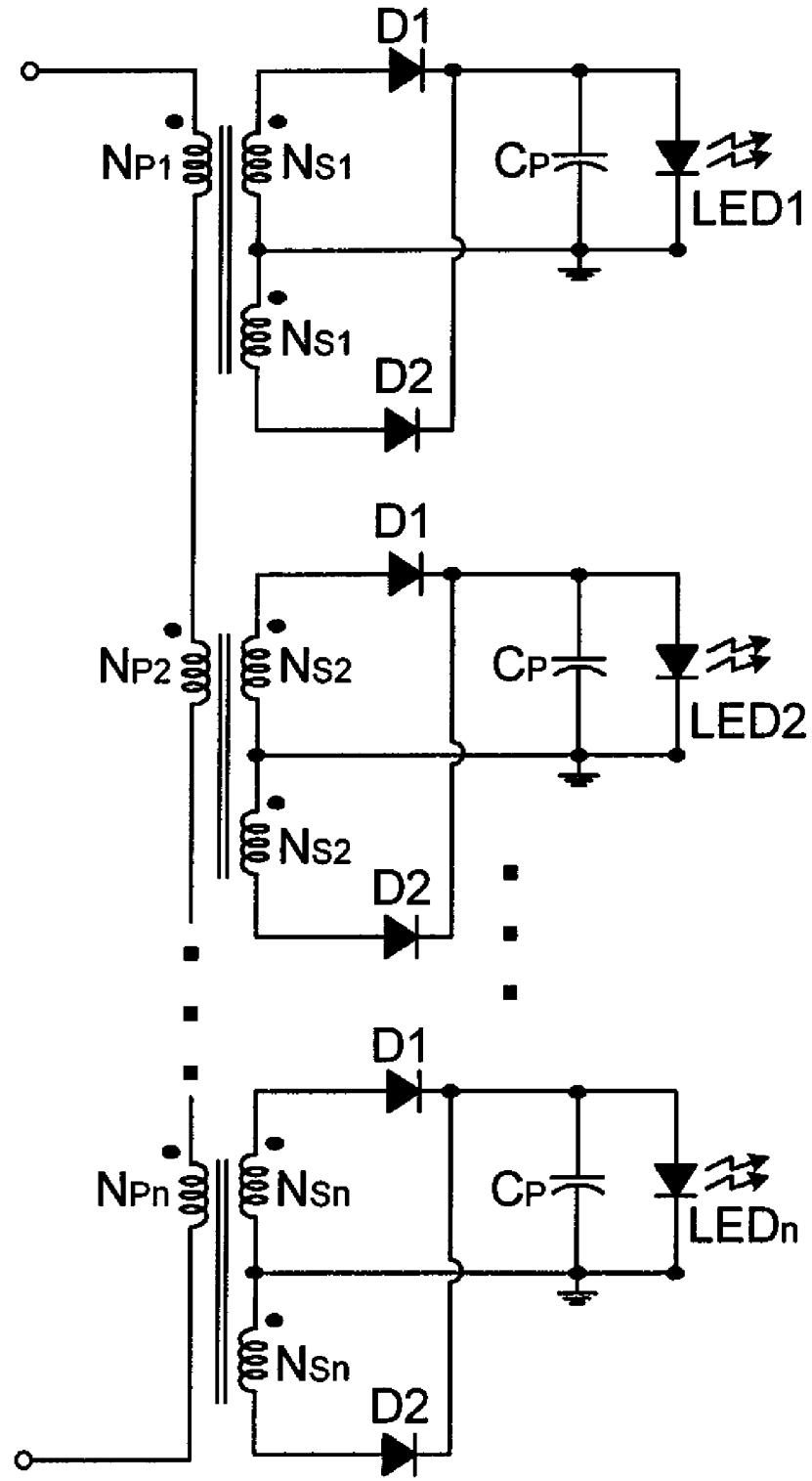

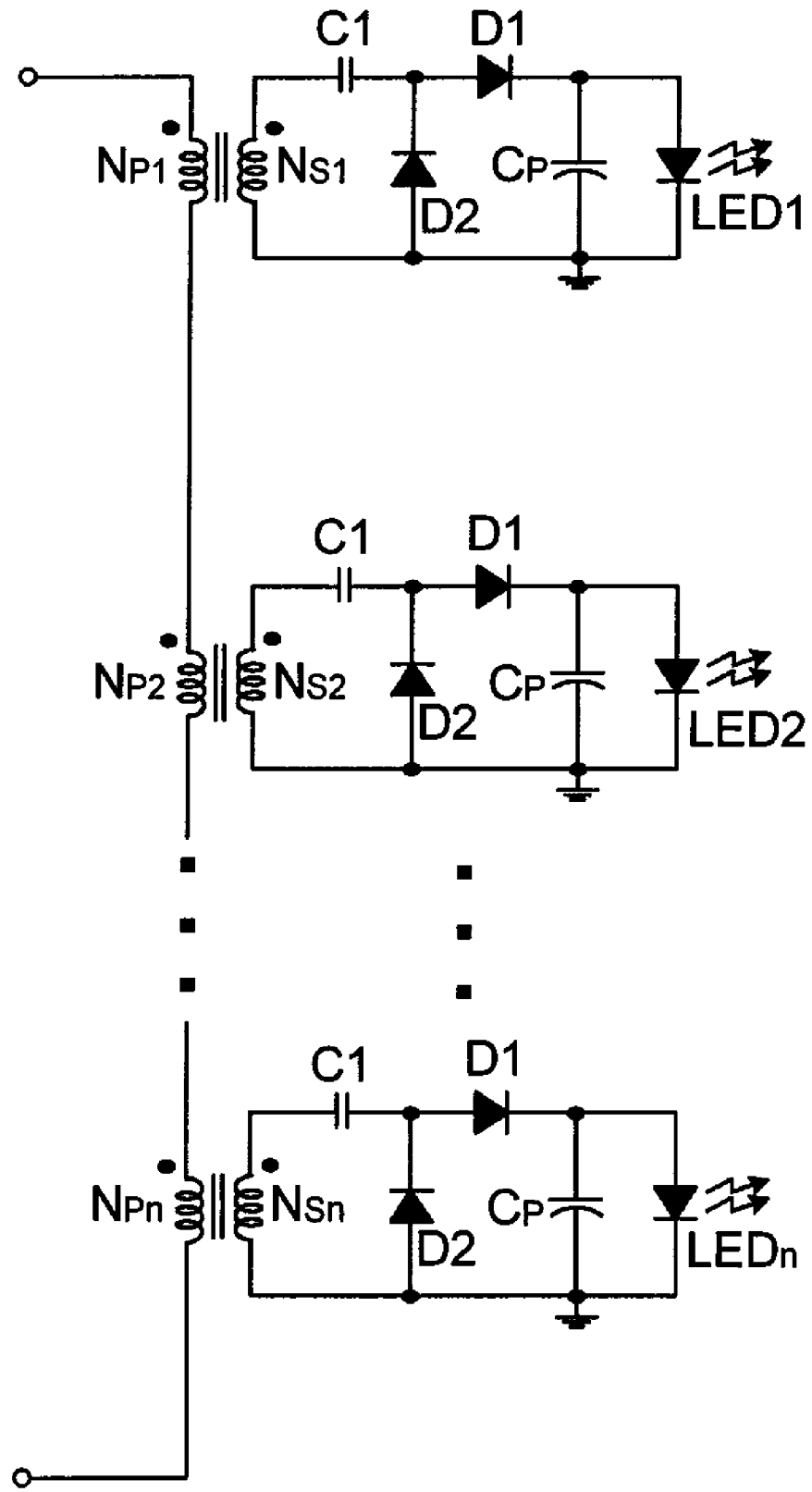
[FIG. 1D]

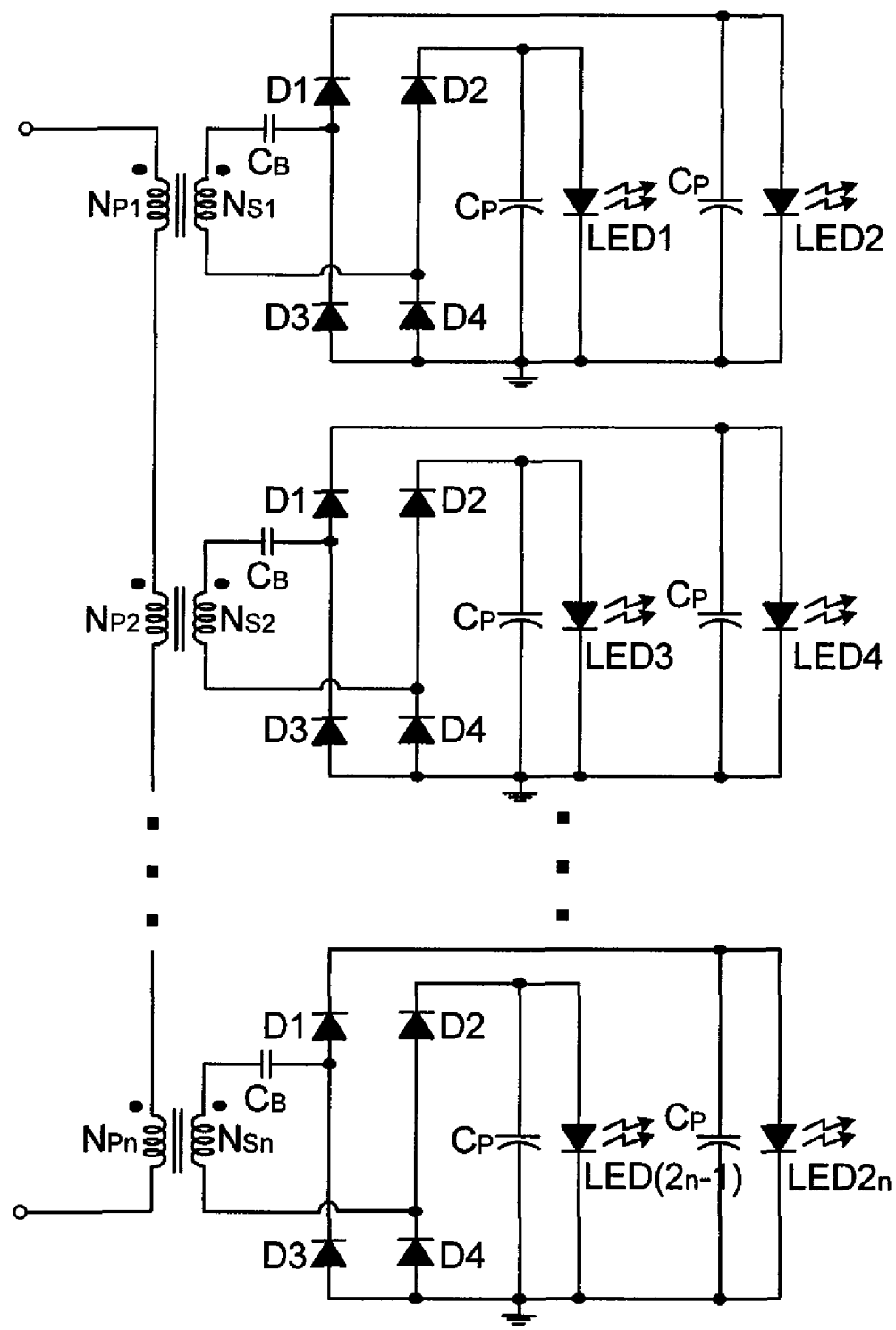
[FIG. 2A]

[FIG. 2B]
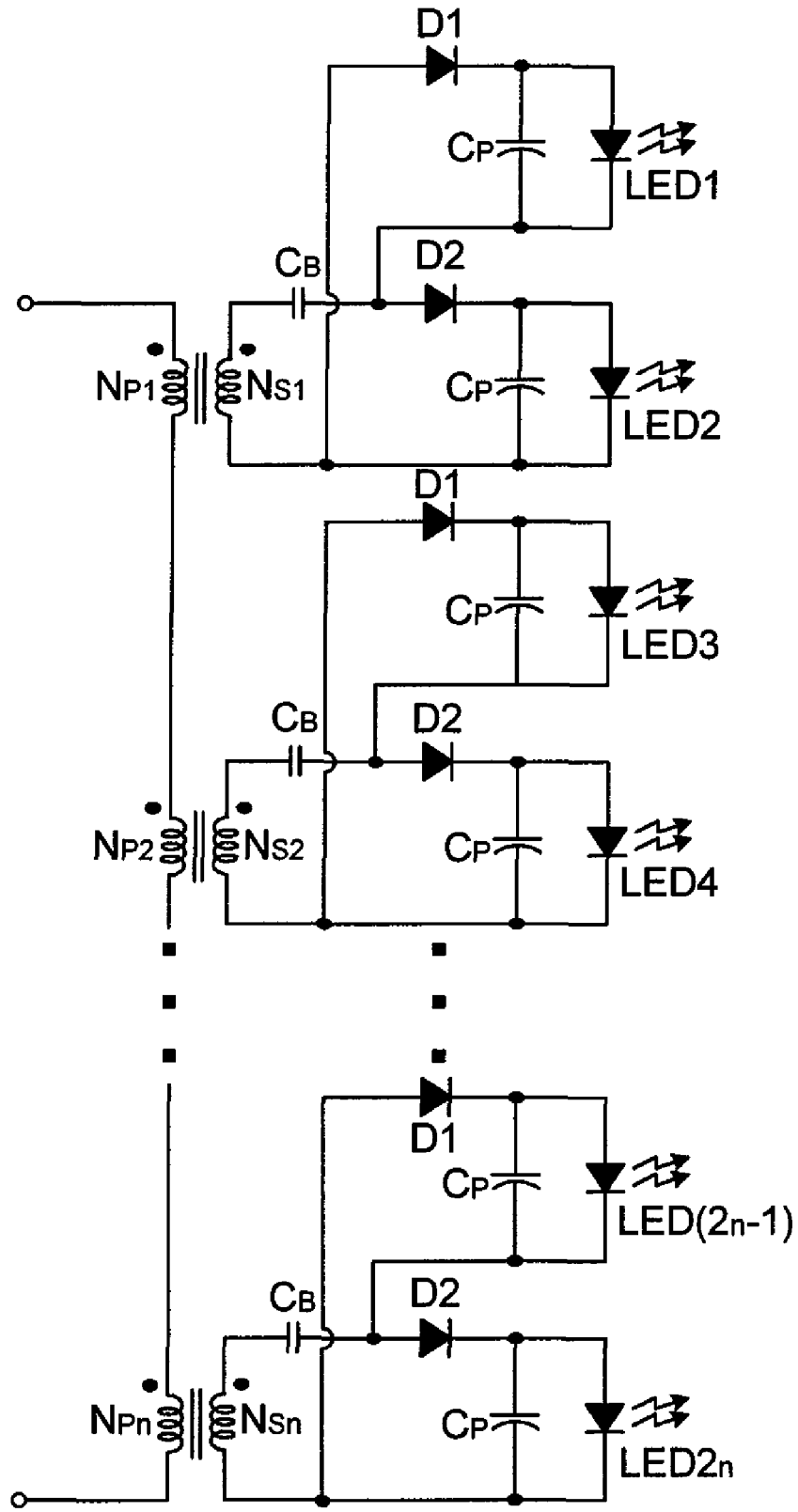

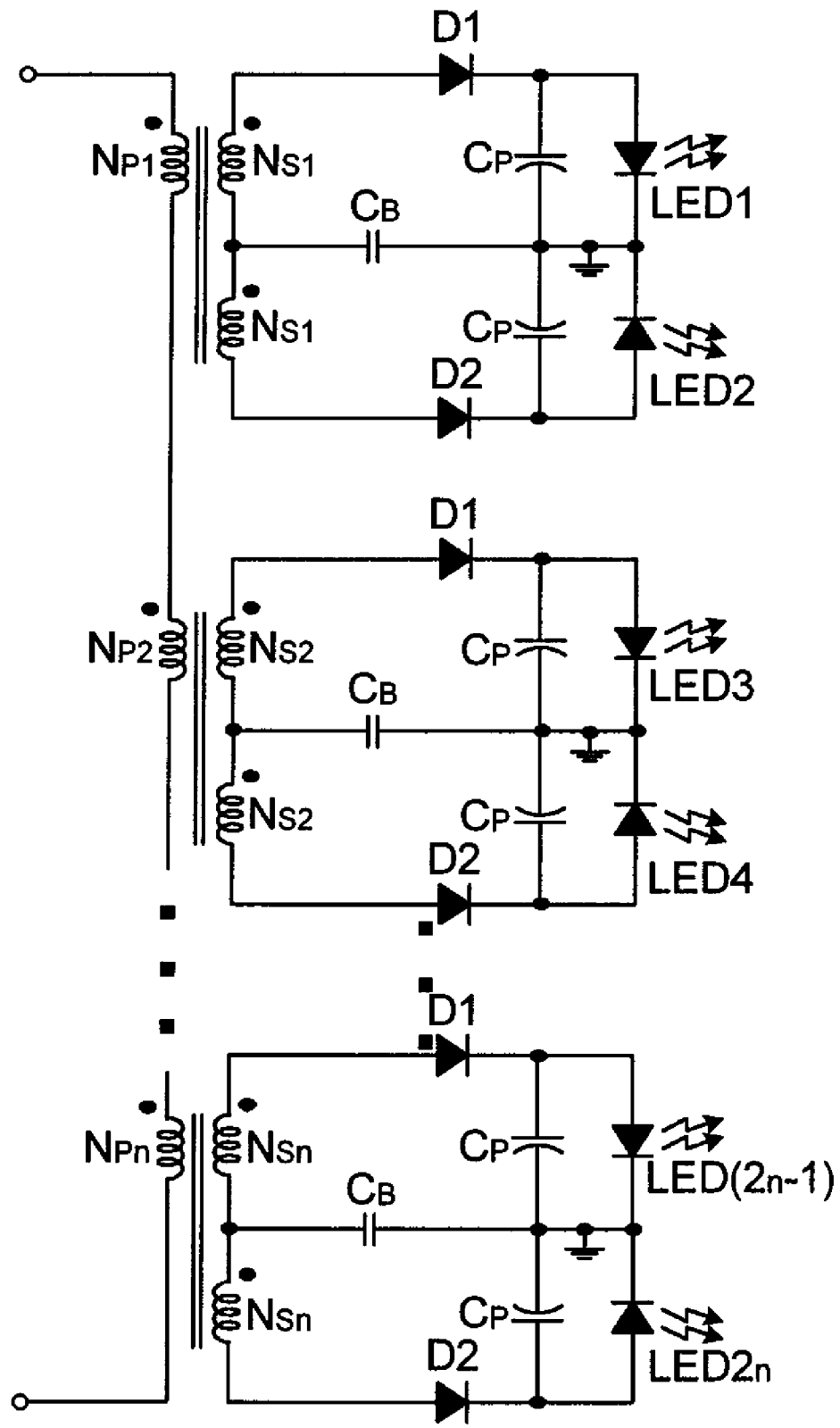
[FIG. 2C]

[FIG. 3A]
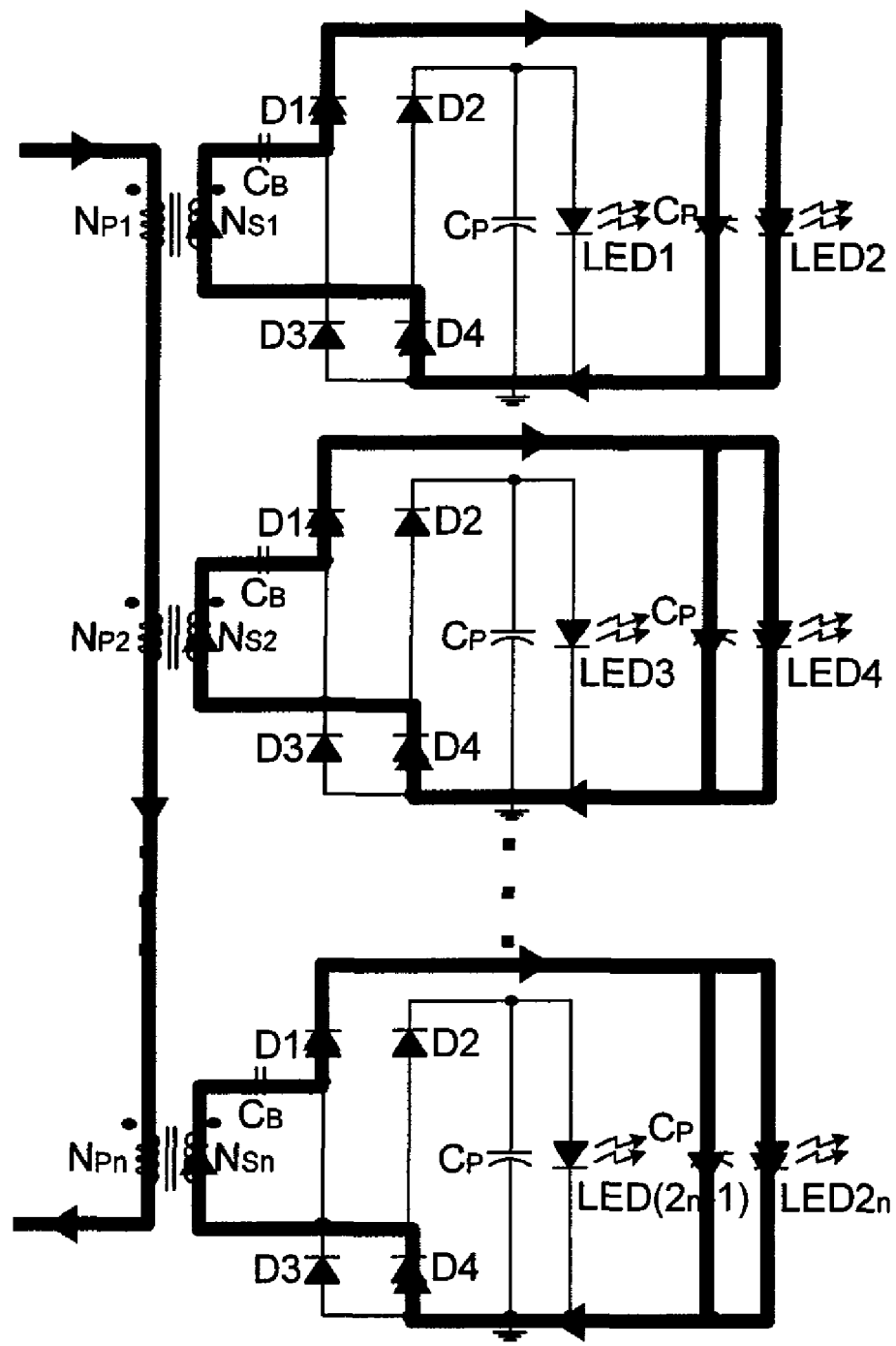

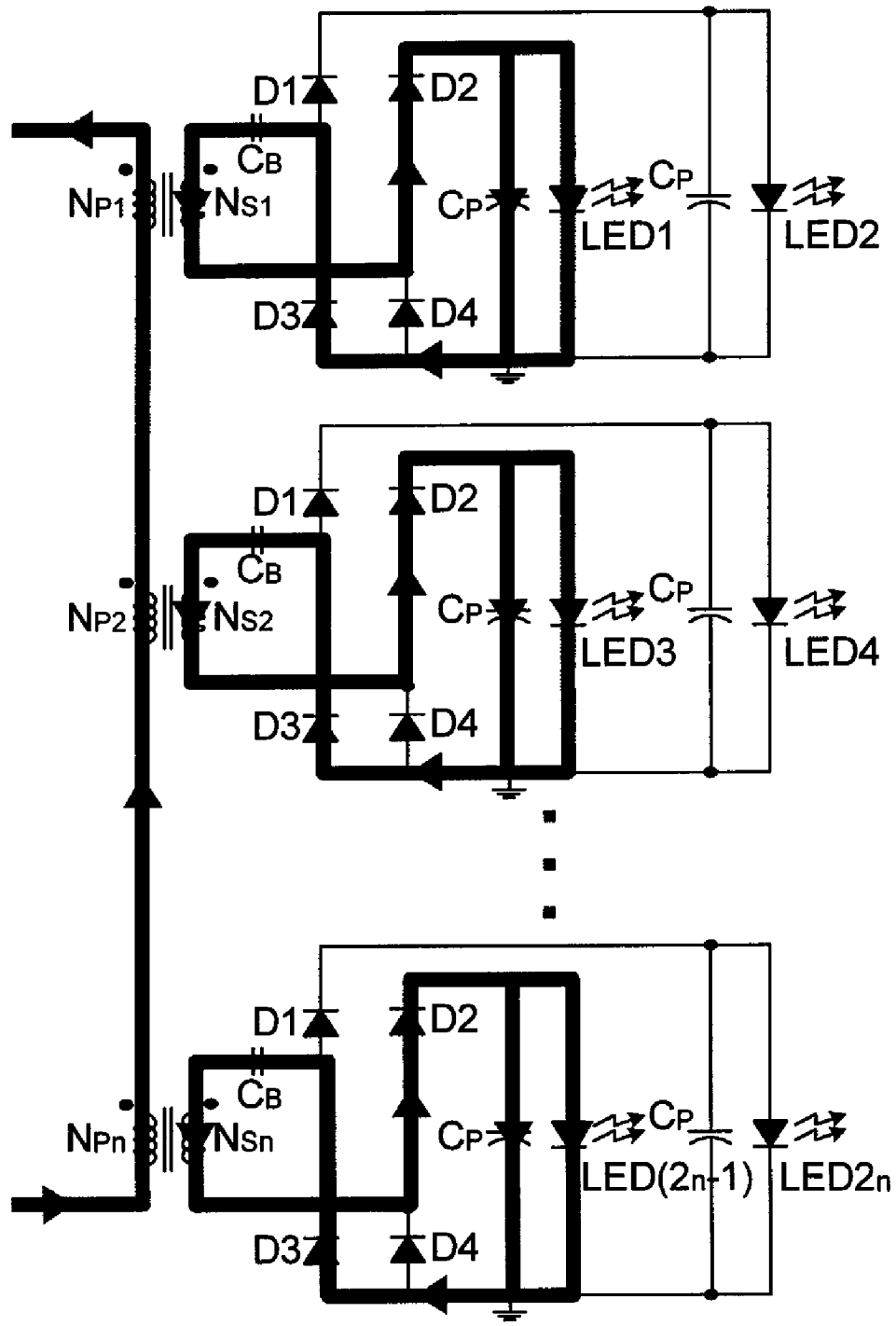
[FIG. 3B]

[FIG. 4A]
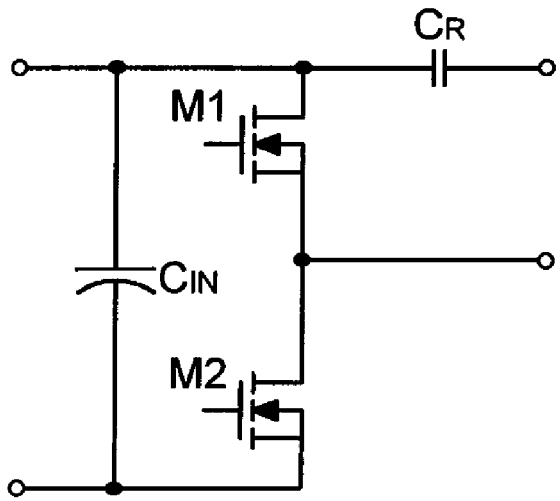
[FIG. 4B]
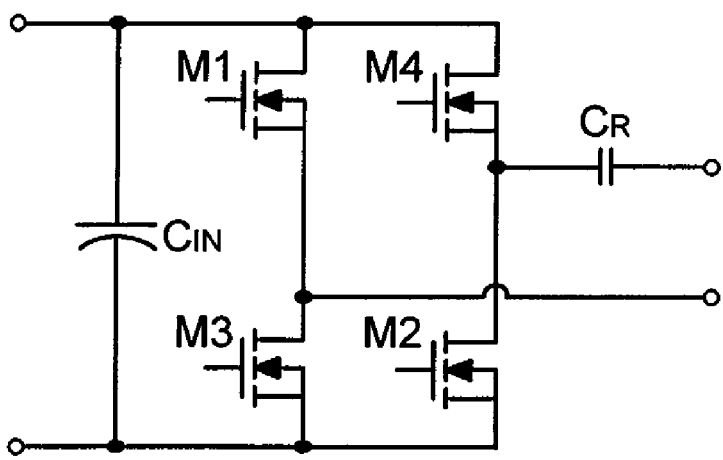
[FIG. 4C]
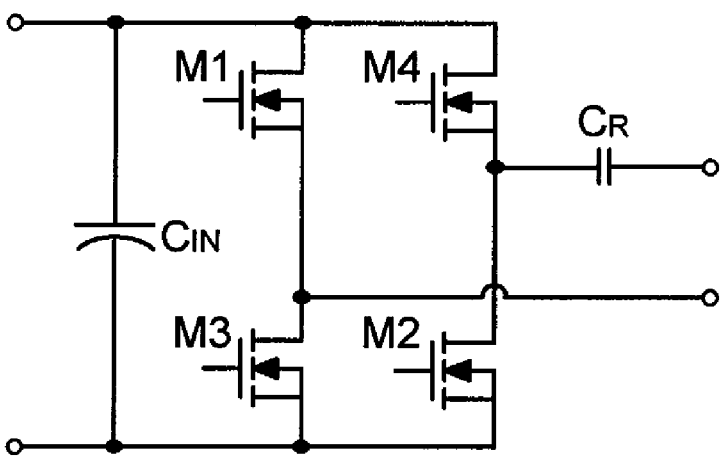

[FIG. 5]
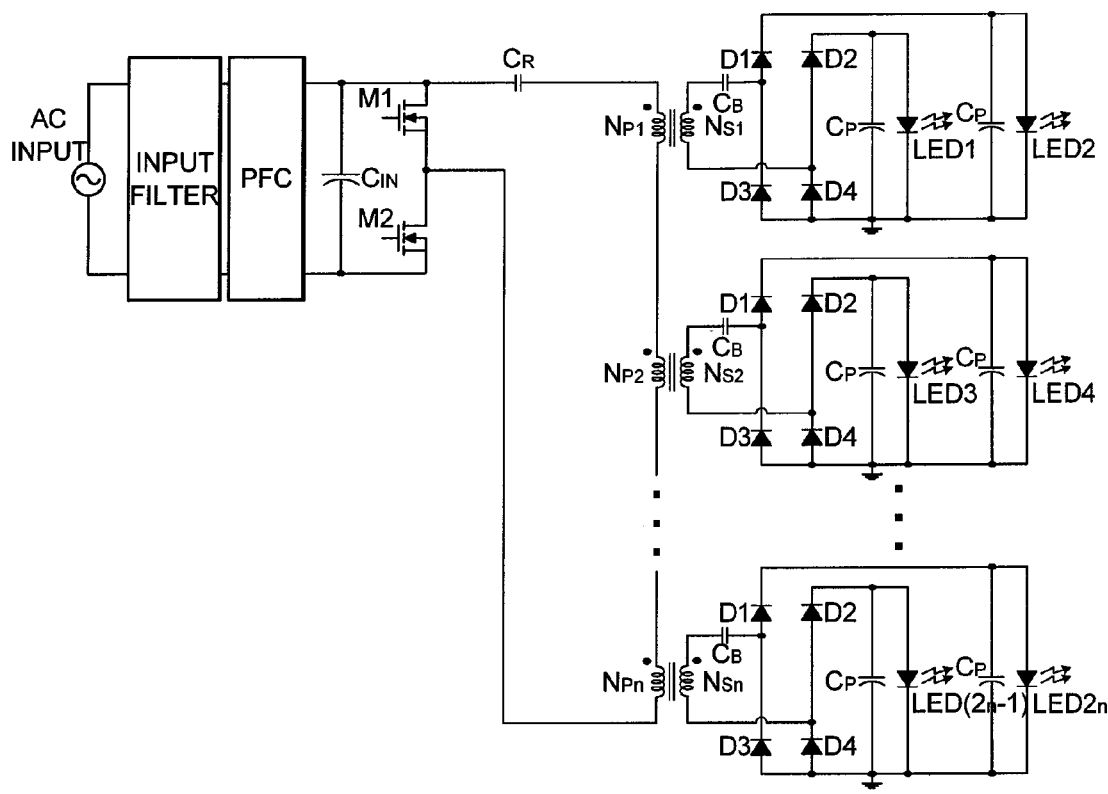

[FIG. 6]
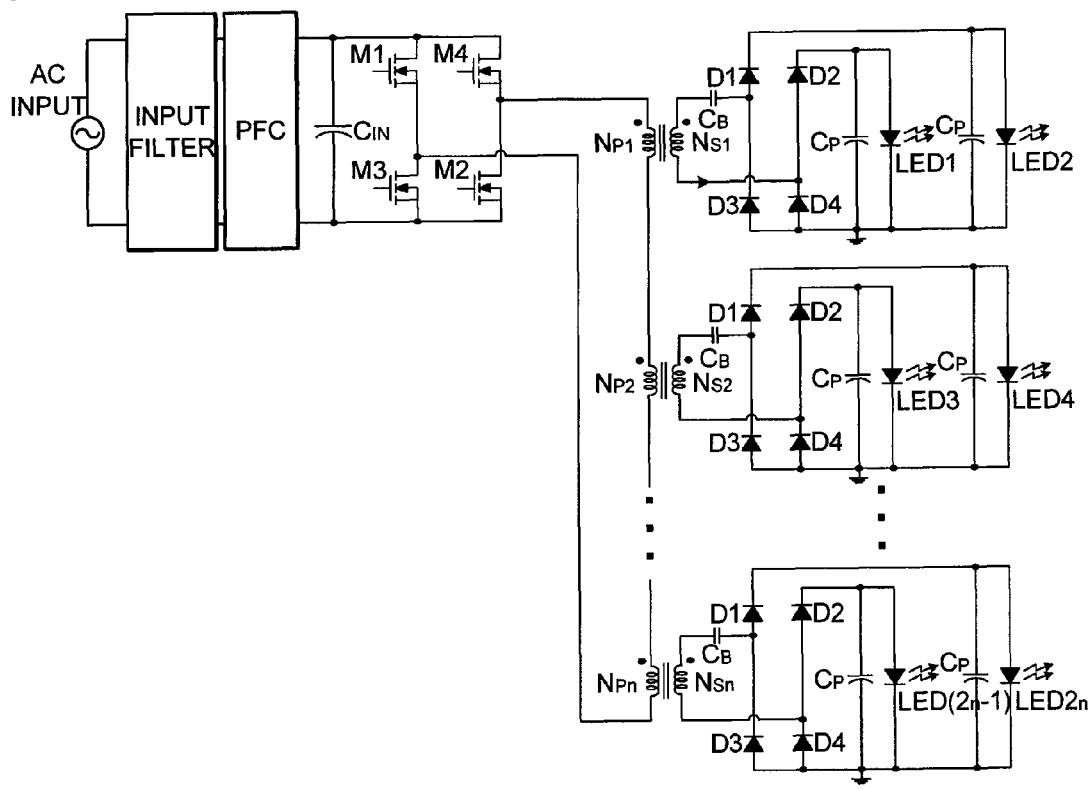

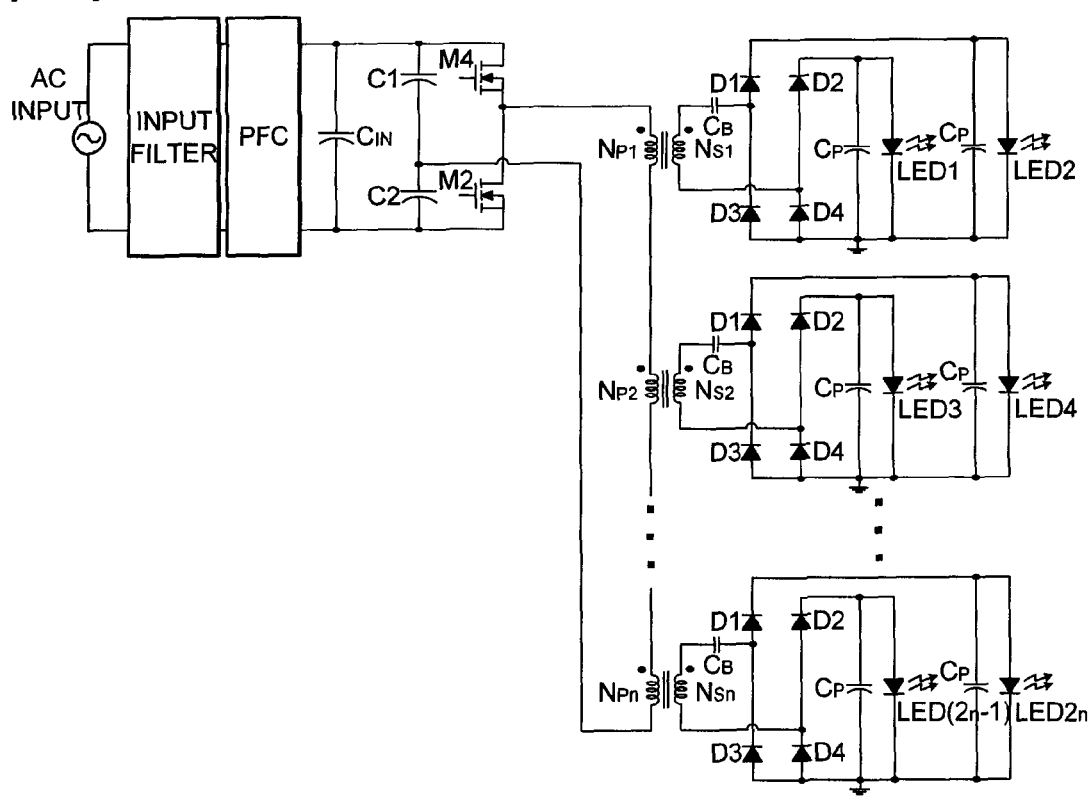
[FIG. 7]

LED DRIVING CIRCUIT

CROSS-REFERENCE TO RELATED APPLICATIONS

This application claims the benefit of Korean Patent Application No. 10-2009-0024371 filed with the Korea Intellectual Property Office on Mar. 23, 2009, the disclosure of which is incorporated herein by reference.

BACKGROUND OF THE INVENTION

1. Field of the Invention

The present invention relates to an LED driving circuit; and, more particularly, to an LED driving circuit capable of implementing constant current control of an LED channel by omitting a DC/DC converter and a control stage which have been necessarily applied for constant current control of an LED channel and by using a transformer having a plurality of primary windings connected to each other in series and a DC blocking capacitor.

2. Description of the Related Art

As the age of CRT (Cathode Ray Tube) which has occupied a monopolistic position until the 20th century draws to a close, a recent display industry is led by a FPD (Flat Panel Display) that is a new technology satisfying need of multimedia age such as high resolution and large screen.

Particularly, in the case of a large-display market, because an LCD (Liquid Crystal Digital) TV has rapidly grown, it is expected to play a leading role in terms of a future cost and marketability.

In the case of a conventional LCD TV, a CCFL (Cold Cathode Fluorescent Lamp) has been mainly used as a backlight light source, while a recent trend is to increasingly use an LED (Light Emitting Diode) having many advantages in terms of power consumption, lifetime, environment-friendly property, and so on.

In the case where the LED is used as the backlight light source of the LCD TV, each LED channel should be secured to be controlled with a constant current in order to secure uniform brightness over the entire screen.

In order to control each of the LED channels with the constant current, a current of the LED channel has been controlled with the constant current by applying a DC/DC converter such as a boost converter to each of the LED channels after acquiring an arbitrary DC voltage. This method has an advantage in that the current of each of the LED channels can be thoroughly controlled, but because the DC/DC converters and the control stages are required as many as the LED channels, a cost increases, power conversion efficiency is deteriorated due to the DC/DC converters, and the volume of an LED driving circuit increases. In addition, there is a problem of reducing reliability of a product due to an active device and ICs employed in the DC/DC converter.

SUMMARY OF THE INVENTION

The present invention has been proposed in order to overcome the above-described problems and it is, therefore, an object of the present invention to provide an LED driving circuit capable of implementing constant current control of an LED channel by omitting DC/DC converters and control stages which have been necessarily applied for constant current control of an LED channel and by using transformers having a plurality of primary windings connected to each other in series and DC blocking capacitors.

In accordance with one aspect of the present invention to achieve the object, there is provided an LED driving circuit including: an inverter unit for switching an input power source; a plurality of transformers including a plurality of primary windings connected to the inverter unit and connected to each other in series and a plurality of secondary windings each of which is coupled with each of the primary windings; a plurality of rectification units each of which is connected to each of the secondary windings; and a plurality of LEDs each of which is connected to each of the rectification units.

In accordance with the present invention, the inverter unit may be formed of any one selected from a group consisting of an LLC resonant inverter, a full-bridge inverter, and a half-bridge inverter.

In accordance with the present invention, the rectification unit may be formed of any one selected from a group consisting of a full-bridge rectifier, a half-wave rectifier, a center-tap rectifier, and a voltage doubler rectifier.

In accordance with the present invention, the LED driving circuit further includes smoothing capacitors positioned between the rectification units and the LEDs and connected to the LEDs in parallel.

In accordance with another aspect of the present invention to achieve the object, there is provided an LED driving circuit including: an inverter unit for switching an input power source; a plurality of transformers including a plurality of primary windings connected to the inverter unit and connected to each other in series and a plurality of secondary windings each of which is coupled with each of the primary windings; a plurality of rectification units each of which is connected to each of the secondary windings; a plurality of DC blocking capacitors each of which is connected between the secondary winding and the rectification unit; and a plurality of LEDs two of which are connected to each of the rectification units.

In accordance with the present invention, the inverter unit may be formed of any one selected from a group consisting of an LLC resonant inverter, a full-bridge inverter, and a half-bridge inverter.

In accordance with the present invention, each of the rectification units includes a first diode of which one end is connected to one end of a second LED; a third diode of which one end is connected to the other end of the first diode; a second diode of which one end is connected to one end of a first LED; and a fourth diode of which one end is connected to the other end of the second diode, wherein the other end of the third diode, the other end of the fourth diode, the other end of the first LED, and the other end of the second LED are connected to a common node, one end of each of the DC blocking capacitors is connected to one end of the second winding, the other end of each of the DC blocking capacitors is connected to a node between the other end of the first diode and one end of the third diode, and the other end of the secondary winding is connected to a node between the other end of the second diode and the one end of the fourth diode.

In accordance with the present invention, each of the rectification units includes a first diode of which one end is connected to one end of a first LED; and a second diode of which one end is connected to one end of a second LED, wherein the other end of the first LED is connected to the other end of the second diode, the other end of the second LED is connected to the other end of the first diode, one end of each of the DC blocking capacitors is connected to one end of the secondary winding, the other end of each of the DC blocking capacitors is connected to a node between the other end of the first LED and the other end of the second diode, and the other end of the secondary winding is connected to a node between the other end of the first diode and the other end of the second LED.

In accordance with the present invention, each of the rectification units includes a first diode of which one end is connected to one end of a first LED; and a second diode of which one end is connected to one end of a second LED, wherein the other end of the first LED is connected to the other end of the second LED, one end of each of the DC blocking capacitors is connected to a center tap, the other end of each of the DC blocking capacitors is connected to a node between the other end of the first LED and the other end of the second LED, a secondary winding positioned at one side of the center tap is connected to the other end of the first diode, and a secondary winding positioned at the other side of the center tap is connected to the other end of the second diode.

In accordance with the present invention, the LED driving circuit includes a first smoothing capacitor connected to the first LED in parallel; and a second smoothing capacitor connected to the second LED in parallel.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 1a to 1d are circuit diagrams of LED driving circuits in accordance with a first embodiment of the present invention;

FIGS. 2a to 2c are circuit diagrams of LED driving circuits in accordance with a second embodiment of the present invention;

FIGS. 3a and 3b are views illustrating operation of the LED driving circuit in accordance with the second embodiment of the present invention;

FIGS. 4a to 4c are circuit diagrams of inverter units in accordance with various embodiments; and FIG. 5 is a circuit diagram of an LED driving circuit employing the rectification unit shown in FIG. 2a and an inverter shown in FIG. 4a;

FIG. 6 is a circuit diagram of an LED driving circuit employing the rectification unit shown in FIG. 2a and an inverter shown in FIG. 4b; and FIG. 7 is a circuit diagram of an LED driving circuit employing the rectification unit shown in FIG. 2a and an inverter shown in FIG. 4c.

DETAILED DESCRIPTION OF THE PREFERABLE EMBODIMENTS

The present invention may include several embodiments through various modifications, wherein specific embodiments are exemplified in the accompanying drawings and will be explained in detail, hereinafter. However, it should be understood that the present invention is not limited to the specific embodiments and includes all modifications, equivalents and substitutions falling within the spirit and technical scope of the present invention. In description of the present invention, if it is determined that detailed description of related published techniques makes the gist of the present invention vague, the detailed description thereof will be omitted.

Although terms such as "first" and "second" may be used in order to describe various components, the components should not be limited by the terms. The terms are used only to distinguish one component from the other components.

The terms of this application are used only to describe the specific embodiments, but are not to be construed to limit the present invention. A singular form includes a plural form as long as the singular form does not clearly indicate a different thing from the plural form. It should be understood that in this application, terms such as "include" or "have" specify existence of a characteristic, a figure, a step, an operation, a component, a part or a combination thereof which are described in the specification but do not previously exclude existence or possibility of addition of one or more different characteristics, figures, steps, operations, components, parts or combinations thereof.

Hereinafter, embodiments of an LED driving circuit in accordance with the present invention will be described in detail with reference to the accompanying drawings. In describing them with reference to the accompanying drawings, the same or corresponding component will be represented by the same reference numeral and repeated description thereof will be omitted.

FIGS. 1a to 1d are circuit diagrams of LED driving circuits in accordance with a first embodiment of the present invention.

Hereinafter, the LED driving circuit will be described with reference to FIGS. 1a to 1d.

The LED driving circuit in accordance with a first embodiment of the present invention includes an inverter unit, a plurality of transformers, a plurality of rectification units, and a plurality of LEDs.

The inverter unit can drive the transformers by switching an input power source. Configuration of the inverter will be described later.

The transformers are connected to the inverter unit and include a plurality of primary windings connected to each other in series and a plurality of secondary windings each of which is coupled with each of the primary windings.

In the transformers, since the primary windings are connected to each other in series, an equal current is applied to each of the primary windings and the equal current is also applied to the secondary windings coupled with the primary windings. Therefore, it is possible to implement constant current control of the LEDs by controlling the current flowing through the primary winding of one transformer.

The rectification units are connected to the secondary windings, respectively. Further, each of the rectification units may be formed of any one selected from a full-bridge rectifier as shown in FIG. 1a, a half-wave rectifier as shown in FIG. 1b, a center-tap rectifier as shown in FIG. 1c, and a voltage-doubler rectifier as shown in FIG. 1d.

One LED may be connected to each of the rectification units. Therefore, if the number of the rectification units is n (n is a natural number), n LEDs may be connected. Further, the LED driving circuit further may include smoothing capacitors Cp between the rectification units and the LEDs to smooth voltages passing through the rectification units.

FIGS. 2a to 2c are circuit diagrams of LED driving circuits in accordance with a second embodiment of the present invention and FIGS. 3a and 3b are views illustrating operation of the LED driving circuit in accordance with the second embodiment of the present invention.

Hereinafter, the LED driving circuit is described with reference to FIGS. 2a to 2c and FIGS. 3a and 3b.

The LED driving circuit in accordance with the second embodiment of the present invention includes an inverter unit, a plurality of transformers, a plurality of rectification units, a plurality of DC blocking capacitors $C_B$, and a plurality of LEDs.

The inverter unit can drive the transformers by switching an input power source. Configuration of the inverter unit will be described later.

The transformers are connected to the inverter unit and include a plurality of primary windings connected to each other in series and a plurality of secondary windings coupled with the primary windings, respectively.

In the transformers, since the primary windings are connected to each other in series, an equal current is applied to each of the primary windings and the equal current is also applied to the secondary windings coupled with the primary windings. Therefore, it is possible to implement constant current control of the LEDs by controlling the current flowing through the primary winding of one transformer.

The rectification units may be connected to the secondary windings, respectively. Further, the DC blocking capacitors $C_B$ are provided between the secondary windings and the rectification units.

And, two LEDs may be connected to each of the rectification units. Therefore, if the number of the rectification units is n (n is a natural number), 2n LEDs can be connected.

Further, it is possible to implement constant current control of LEDs by keeping the currents flowing through the two LEDs connected to each of the rectification units equal through the DC blocking capacitors $C_B$.

As shown in FIG. 2a, the rectification unit includes a first diode D1 of which one end is connected to one end of a second LED, a third diode D3 of which one end is connected to the other end of the first diode D1, a second diode D2 of which one end is connected to one end of a first LED, and a fourth diode D4 of which one end is connected to the other end of the second diode D2.

Further, the other end of the third diode D3, the other end of the fourth diode D4, the other end of the first LED, and the other end of the second LED may be connected to a common node.

Further, one end of each of the DC blocking capacitors $C_B$ is connected to one of the secondary winding and the other end thereof is connected to a node between the other end of the first diode D1 and the one end of the third diode D3. The other end of the second winding is connected to a node between the other end of the second diode D2 and the one end of the fourth diode D4.

Further, a first smoothing capacitor $C_P$ for smoothing a voltage passing through the rectification unit is connected to the first LED in parallel and a second smoothing capacitor $C_P$ may be connected to the second LED in parallel.

A rectification unit shown in FIG. 2b includes a first diode D1 of which one end is connected to one end of a first LED and a second diode D2 of which one end is connected to one end of a second LED.

Further, the other end of the first LED is connected to the other end of the second diode D2 and the other end of the second LED is connected to the other end of the first diode D1.

Further, one end of each of the DC blocking capacitors $C_B$ is connected to one end of the secondary winding and the other end thereof is connected to a node between the other end of the first LED and the other end of the second diode D2. The other end of the second winding is connected to a node between the other end of the first diode D1 and the other end of the second LED.

Further, a first smoothing capacitor $C_P$ for smoothing a voltage passing through the rectification unit is connected to the first LED in parallel and a second smoothing capacitor $C_P$ is connected to the second LED in parallel.

A rectification unit shown in FIG. 2c includes a first diode D1 of which one end is connected to one end of a first LED and a second diode D2 of which one end is connected to one end of a second LED.

Further, the other end of the first LED is connected to the other end of the second LED.

Further, one end of each of the blocking capacitors $C_B$ is connected to a center tap and the other end thereof is connected to a node between the other end of the first LED and the other end of the second LED. A secondary winding positioned at one side of the center-tap is connected to the other end of the first diode D1 and a secondary winding positioned at the other side of the center tap is connected to the other end of the second diode D2.

Further, a first smoothing capacitor $C_P$ for smoothing a voltage passing through the rectification unit is connected to the first LED in parallel and a second smoothing capacitor $C_P$ is connected to the second LED in parallel.

Hereinafter, operation of the LED driving circuit in accordance with the second embodiment of the present invention will be described. First, as shown in FIG. 3a, a current conduction path is formed on primary windings of transformers for the first half of the entire operation period of an inverter unit connected to the primary windings of the transformers. At this time, since all of the primary windings of the transformer are connected to each other in series, if an equal current flows and turn ratios of the transformers are equal, equal currents are generated at secondary windings.

Further, as shown in FIG. 3b, a current conduction path is formed at the primary windings of the transformers for the second half of the entire operation period of the inverter unit connected to the primary windings of the transformers. At this time, similarly, since the primary windings of the transformers are connected to each other in series, if an equal current flows and turns ratios of the transformers are equal, equal currents are generated at the secondary windings.

At this time, since DC blocking capacitors $C_B$ are inserted between the secondary windings of the transformers and the rectification units, a DC offset (average value) of the entire currents is eliminated according to the charge balance law of a capacitor and therefore current values of all LED channels can be controlled to be equal.

As a result, the LED driving circuit in accordance with the second embodiment of the present invention can reduce the number of the transformers and the number of the rectification units by half in comparison with the LED driving circuit in accordance with the first embodiment of the present invention.

FIGS. 4a to 4c are circuit diagrams of inverter units in accordance with various embodiments.

Hereinafter, the inverter unit will be described with reference to FIGS. 4a to 4c.

FIG. 4a shows an LLC resonant inverter, FIG. 4b shows a full-bridge inverter, and FIG. 4c shows a half-bridge inverter. The inverter unit of the LED driving circuit in accordance with the present invention may be formed of various types of inverters as described above and as for a driving method, a PWM (Pulse Width Modulation) method and a PFM (Pulse Frequency Modulation) method may be used.

FIG. 5 is a circuit diagram of an LED driving circuit employing the rectification unit shown in FIG. 2a and the inverter shown in FIG. 4a, FIG. 6 is a circuit diagram of an LED driving circuit employing the rectification unit shown in FIG. 2a and the inverter shown in FIG. 4b, and FIG. 7 is a circuit diagram of an LED driving circuit employing the rectification unit shown in FIG. 2a and the inverter shown in FIG. 4c.

The LED driving circuit shown in FIGS. 5 to 7 may further include a PFC (Power Factor Correction) unit positioned at a front stage of the inverter unit, an input filter positioned at a front stage of the PFC unit, and an AC power stage positioned at a front stage of the input filter.

Since as shown in FIGS. 5 to 7, the inverter unit connected to the primary winding of the transformers may be formed of various inverters shown in FIGS. 4a to 4c, a designer can select and design the most appropriate circuit according to specifications of products.

Meanwhile, although as shown in FIGS. 5 to 7, the rectification units connected to the secondary windings of the transformers are formed of the rectification units shown in FIG. 2a, it may be formed of the various types of rectification units shown in FIGS. 1a to 2d and FIGS. 2a to 2c without being limited to the rectification units shown in FIGS. 5 to 7.

A constant current control method of the LED driving circuit in accordance with the present invention as shown in FIGS. 5 to 7 can control currents of the other LED channels with a constant current by controlling a current of one LED channel regardless of the number of total LED channels, while a conventional LED driving circuit employed DC/DC converters and control stages as many as LED channels in order to control a current of each of the LED channels with a constant current.

Therefore, the LED driving circuit in accordance with the present invention is very advantageous in terms of cost reduction by omitting the DC/DC converters and the control stages employed in the conventional circuit and can improve power conversion efficiency by omitting the DC/DC converters. Further, since the volume of the LED driving circuit is reduced by omitting the DC/DC converters and the control stages to thereby increase power density, it is advantageous for miniaturization of a product and active devices and ICs are omitted, thereby enhancing the reliability of the product.

As described above, the prevent invention provides the high efficiency and low-cost LED driving circuit capable of improving the reliability by reducing a manufacture cost and improving the power conversion efficiency and the power density by omitting the DC/DC converters and the control stages necessarily applied for the constant current control of the LED channels and using the transformers provided with the primary windings connected to each other in series and the DC blocking capacitors.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An LED driving circuit, comprising:
an inverter unit for switching an input power source;
a plurality of transformers including a plurality of primary windings connected to the inverter unit and connected to each other in series and a plurality of secondary windings each of which is coupled with one of the primary windings;
a plurality of rectification units each of which is connected to one of the secondary windings;
a plurality of DC blocking capacitors each of which is connected between one of the secondary windings and one of the rectification units; and
a plurality of LEDs, two of which are connected to each of the rectification units,
wherein each of the rectification units includes:
a first diode of which one end is connected to one end of a second LED of the two LEDs connected to one of the rectification units;
a third diode of which one end is connected to the other end of the first diode;
a second diode of which one end is connected to one end of a first LED of the two LEDs connected to one of the rectification units; and
a fourth diode of which one end is connected to the other end of the second diode,
wherein the other end of the third diode, the other end of the fourth diode, the other end of the first LED, and the other end of the second LED are connected to a common node, one end of the respective DC blocking capacitor is connected to one end of the respective second winding, the other end of the respective DC blocking capacitor is connected to a node between the other end of the first diode and the one end of the third diode, and the other end of the respective secondary winding is connected to a node between the other end of the second diode and the one end of the fourth diode.

2. The LED driving circuit of claim 1, further comprising:
a first smoothing capacitor connected to the first LED in parallel; and
a second smoothing capacitor connected to the second LED in parallel.

3. An LED driving circuit, comprising:
an inverter unit for switching an input power source;
a plurality of transformers including a plurality of primary windings connected to the inverter unit and connected to each other in series and a plurality of secondary windings each of which is coupled with one of the primary windings;
a plurality of rectification units each of which is connected to one of the secondary windings;
a plurality of DC blocking capacitors each of which is connected between one of the secondary windings and one of the rectification units; and
a plurality of LEDs, two of which are connected to each of the rectification units,
wherein each of the rectification units includes:
a first diode of which one end is connected to one end of a first LED of the two LEDs connected to the rectification unit; and
a second diode of which one end is connected to one end of a second LED of the two LEDs connected to the rectification unit,
wherein the other end of the first LED is connected to the other end of the second diode, the other end of the second LED is connected to the other end of the first diode, one end of the respective DC blocking capacitor is connected to one end of the respective secondary winding, the other end of the respective DC blocking capacitor is connected to a node between the other end of the first LED and the other end of the second diode, and the other end of the respective secondary winding is connected to a node between the other end of the first diode and the other end of the second LED.

4. The LED driving circuit of claim 3, further comprising:
a first smoothing capacitor connected to the first LED in parallel; and
a second smoothing capacitor connected to the second LED in parallel.

5. An LED driving circuit, comprising:
an inverter unit for switching an input power source;
a plurality of transformers including a plurality of primary windings connected to the inverter unit and connected to each other in series and a plurality of secondary windings each of which is coupled with one of the primary windings;
a plurality of rectification units each of which is connected to one of the secondary windings;
a plurality of DC blocking capacitors each of which is connected between one of the secondary windings and one of the rectification units; and
a plurality of LEDs, two of which are connected to each of the rectification units,
wherein each of the rectification units includes:
a first diode of which one end is connected to one end of a first LED of the two LEDs connected to the rectification unit; and
a second diode of which one end is connected to one end of a second LED of the two LEDs connected to the rectification unit,
wherein the other end of the first LED is connected to the other end of the second LED, one end of the respective DC blocking capacitor is connected to a center tap of the respective secondary winding, the other end of the respective DC blocking capacitor is connected to a node between the other end of the first LED and the other end of the second LED, a portion of the respective secondary winding positioned at one side of the center tap is connected to the other end of the first diode, and another portion of the respective secondary winding positioned at the other side of the center tap is connected to the other end of the second diode.

6. The LED driving circuit of claim 5, further comprising:
a first smoothing capacitor connected to the first LED in parallel; and
a second smoothing capacitor connected to the second LED in parallel.

\* \* \* \* \*